United States Patent [19]

Watanabe et al.

[11] Patent Number: 5,236,688

[45] Date of Patent: Aug. 17, 1993

[54] METHOD FOR ACTIVATING INFUSIBILIZED PITCH BEADS

[75] Inventors: Kunio Watanabe; Takao Ishihara; Yasuo Sakaguchi, all of Iwaki, Japan

[73] Assignee: Kureha Kagaku Kogyo Kabushiki Kaisha, Tokyo, Japan

[21] Appl. No.: 733,010

[22] Filed: Jul. 19, 1991

Related U.S. Application Data

[63] Continuation of Ser. No. 440,042, Nov. 21, 1989, abandoned, which is a continuation-in-part of Ser. No. 269,036, Nov. 9, 1988, abandoned.

[30] Foreign Application Priority Data

Nov. 13, 1987 [JP] Japan .................. 62-287056

[51] Int. Cl.$^5$ .............................................. C09C 1/56
[52] U.S. Cl. ........................... 423/460; 423/445; 423/449.2; 423/DIG. 16; 502/431
[58] Field of Search .............. 423/445, 449, 460; 34/10; 502/431

[56] References Cited

U.S. PATENT DOCUMENTS

| | | | |
|---|---|---|---|
| 4,039,290 | 8/1977 | Inada et al. | 502/47 |
| 4,169,051 | 9/1979 | Satoh et al. | 502/402 |
| 4,237,107 | 12/1980 | Gillot et al. | 423/445 |
| 4,366,138 | 12/1982 | Eisenmenger et al. | 423/445 |
| 4,696,682 | 9/1987 | Hirai et al. | 55/68 |
| 4,970,829 | 11/1990 | Hirai et al. | 55/68 |

FOREIGN PATENT DOCUMENTS 62-158787 7/1987 Japan ................... 423/445

*Primary Examiner*—Robert Kunemund
*Attorney, Agent, or Firm*—Nixon & Vanderhye

[57] ABSTRACT

Disclosed herein are a method for batchwisely calcining and activating infusibilized spherical pitch beads in an upper stage and a lower stage fluidized beds formed on respective perforated plates, by calcining the pitch beads in the upper stage at 600–800° C. with a heated exhaust gas from a space for the lower stage, discharging activated carbon beads of the previous batch from the space for the lower stage, stopping the fluidization of the upper stage by guiding the exhaust gas from the space for the lower stage to the space for the upper stage through a bypass line so that the calcined beads can fall down to the space for the lower stage through the holes of the perforated plate of the upper stage, and activating the falling calcined beads at 800–1200° C. while forming the lower stage fluidized bed with a heated calcining and activating gas, and a furnace used for the above method.

2 Claims, 1 Drawing Sheet

METHOD FOR ACTIVATING INFUSIBILIZED PITCH BEADS

This is a continuation of application Ser. No. 07/440,042, filed Nov. 21, 1989, now abandoned which is a continuation-in-part of application Ser. No. 07/269,036, filed Nov. 9, 1988, now abandoned.

BACKGROUND OF THE INVENTION

The present invention relates to a method for batchwisely calcining and activating infusibilized spherical pitch beads in a two-stage fluidized bed, the beads having been obtained by molding a petroleum pitch or a coal pitch into spheres and infusibilizing thereof.

So far, carbon beads or activated carbon beads are manufactured by the methods comprising: (1) blending petroleum pitch or coal pitch with a viscosity-adjusting agent; (2) melt-molding the blend into spheres; (3) extracting the agent by a solvent from the molded; (4) infusibilizing the extracted; (5) calcinating the infusibilized to have carbon beads and (6) activating the beads into activated carbon beads.

Infusibilization of the pitch beads is performed at a temperature not higher than 400° C. in the presence of an oxidizing gas, such as $O_2$, $O_3$, $SO_3$, $NO_2$, an oxidizing gas diluted with air or nitrogen, or air, oxidizing and thermally infusibilizing the pitch beads. Then, the infusibilized pitch beads obtained are calcinated at a temperature not lower than 600° C. in an inactive atmosphere to give carbon beads. Further, by activating the infusibilized spherical pitch beads or the spherical carbon beads with an activating gas, mainly consisting of nitrogen and steam, at a temperature of 800° to 1,200° C., the activated spherical carbon beads are obtained.

As an apparatus to produce spherical carbon beads or spherical activated carbon beads, a rotary kiln system or a one stage batchwise fluidized bed system have been widely used. However, in the rotary kiln system, there are following problems: namely, too large size of apparatus due to a poor volume efficiency of the furnace, the resultant long reaction time, low efficiency of operation due to a complicated mechanism to prevent inflow of air to the kiln during a high temperature activation and short life of the apparatus due to thermal strain and oxidation of its materials. On the other hand, in the one-stage batchwise fluidized bed system, since the difference between the both temperatures at the start of carbonization and at the end of activation is as large as at least 500° to 600° C., there are large problems that it is difficult to select a furnace material which is durable to high temperature and heat-shock and it is difficult to continue the operation for a long time period and to decrease the reparing cost, due to the short life of the furnace material. That is, as the apparatus material, an expensive heat proof and anticorrosive one has been used, however, in order to further decrease the repairing cost and prolong the stable operation, the temperature-raising rate from the end of infusibilization of pitch beads to the start of activation of infusibilized pitch beads had to be decreased, for instant, upto 50° C./hr and further, the activating reaction temperature had to be as low as possible. Therefore, there is a problem that the reaction takes necessarily a long time. Accordingly, the system is not necessarily a satisfactory one.

On the other hand, there has been proposed a process for continuously activating granular carbonized coal particles in a plurality of interconnected fluidized beds supported on a horizontal gas distributor plates having tuyeres projecting above the upper surface thereof (refer to U.S. Pat. No. 3,976,597). However, in a horizontal-type apparatus using for this process, a plurality of compartments are connected horizontally and the activating gas is introduced into each of compartments in parallel. Therefore, it is difficult for such an apparatus to decrease an area for installation thereof and to decrease the necessary gas volume and the heat loss. In addition, since the fluidized particles are transferred to the next compartment by overflowing upon each outlet, the distribution of retention time of particles in the fluidized bed is spread resulting in lowering of uniformity in the product quality.

Further, there has been proposed a chamber for forming fluidized beds of finely divided solid such as iron ore fines, containing upper and lower beds supported on horizontal perforate partitions, the chamber having an overflow pipe connecting the both beds (refer to BP 880,792). However, also in this apparatus, the fine solid is transferred from the upper bed to the low bed through the overflow pipe and as a result, the distribution of retention time of fine solid in the fluidized bed is spread resulting in lowering of uniformity in the product quality.

As a result of the present inventors' extensive study on a method and an apparatus to activate infusibilized spherical pitch beads easily and in a high yield in order to overcome the above problems, they have found a new method for batchwisely calcining and activating the pitch beads in an upper stage and a lower stage fluidized beds formed on respective perforated plates, comprising the steps of calcining the pitch beads in the upper stage at 600°-800° C. with a heated exhaust gas from a space for the lower stage, discharging activated carbon beads of the previous batch from the space for the lower stage, stopping the fluidization of the upper stage by guiding the exhaust gas from the space for the lower stage to the space for the upper stage through a bypass line so that the calcined beads can fall down to the space for the lower stage through the holes of the perforated plate of the upper stage, and activating the falling calcined beads at 800°-1200° C. with a heated calcining and activating gas which has a rising gas velocity maintained in a certain limited range.

By this new method it is possible to increase their yield per unit time, to reduce tower diameter of the furnace and to reduce the energy cost due to a reduction of the reaction time. On the basis of these findings, the present inventors have attained the present invention.

That is, the first object of the present invention is to provide a method to produce the spherical activated carbon beads with a good productivity.

The second object of the present invention is to provide a method for producing the spherical activated carbon of a uniform quality at a relatively low cost.

The third object of the present invention is to provide a method for producing spherical activated carbon beads, which method is able to use a more compact apparatus with the same productive capacity as compared to a conventional method.

The fourth object of the present invention is to provide an activating furnace for activating infusibilized spherical pitch beads, which is more compact with the same productive capacity than a conventional apparatus.

SUMMARY OF THE INVENTION

In a first aspect of the present invention, there is provided a method for batchwisely calcining and activating infusibilized spherical pitch beads in a upper stage fluidized bed formed on a perforated plate of the upper stage fluidized bed and in a lower stage fluidized bed formed on a perforated plate of the lower stage fluidized bed, comprising the steps of;

(1) calcining the infusibilized spherical pitch beads in the upper stage fluidized bed at a temperature of 600° to 800° C. with a heated exhaust gas which is introduced thereto through holes of the perforated plate of the upper stage fluidized bed from a space for the lower stage fluidized bed, wherein holes of the perforated plate of the upper stage fluidized bed have calibers regulated so that the pitch beads do not fall down to the space for the lower stage fluidized bed during the fluidization of the infusibilized pitch beads in the upper stage fluidized bed, (2) discharging activated carbon beads of the previous batch in which the activation has been already over, from the space for the lower stage fluidized bed to empty the space, (3) thereafter, stopping the fluidization of the upper stage fluidized bed by guiding the exhaust gas from the space for the lower stage fluidized bed to the space for the upper stage fluidized bed through a bypass line, not through the holes of the perforated plate of the upper stage fluidized bed, so that the calcined beads can fall down to the space for the lower stage fluidized bed through the holes of the perforated plate of the upper stage fluidized bed and (4) activating the calcined beads which have fallen down on the perforated plate of the lower stage fluidized bed, at a temperature of 800° to 1200° C. while forming the lower stage fluidized bed with a heated calcining and activating gas which has a rising gas velocity maintained in the range of not larger than the terminal fluidization gas velocity for the activated carbon beads in the lower stage fluidized bed and of not smaller than the minimum fluidization gas velocity for the infusibilized pitch beads in the upper stage fluidized bed.

In a second aspect of the present invention, there is provided a furnace for batchwisely calcining and activating infusibilized pitch beads, which has a vertical tower construction and comprises (1) a space 2 for an upper stage fluidized bed, (2) a space 3 for a lower stage fluidized bed, (3) a bottom space 13, (4) a perforated plate 4 dividing the space 2 from the space 3, (5) a perforated plate 5 dividing the space 3 from the bottom space 13 and (6) a gas bypass line 12, the space 2 being provided with an inlet 6 for introducing infusibilized pitch beads into the furnace and an outlet 9 for discharging a heated exhaust gas, respectively on the upper part of the space 2, the perforated plate 4 being provided with a plurality of holes having calibers regulated so that the beads calcined by heating in the upper stage fluidized bed can fall down to the space 3 passing through the holes when the fluidization of the upper stage fluidized bed is stopped by guiding the heated exhaust gas to the space 2 from the space 3 through the gas bypass line 12 and so that the beads being calcined in a fluidized state do not substantially fall down to the space 3, the space 3 being connected to the bottom of the space 2 and provided with an outlet 7 for discharging the carbon beads activated by heating in the fluidized bed of the space 3, on the lower part of the space 3, the perforated plate 5 being provided with a plurality of holes having calibers regulated so that a heated activating gas for forming the lower stage fluidized bed can pass through the holes and so that the activated carbon beads do not remain on the perforated plate 5, the bottom space 13 being connected to the bottom of the space 3 and provided with an inlet 8 for introducing the heated activating gas for forming the lower stage fluidized bed in the space 3, an upper side wall of the space 2 and an upper side wall of the space 3 being linked together outside the furnace by the-gas bypass line 12 which is provided with a valve 10 for opening and shutting the line 12 on the middle thereof.

BRIEF EXPLANATION OF DRAWING

In FIG. 1:
1: a main body of the activating furnace with a two-stage fluidized bed,
2: a space for a first stage (upper stage) fluidized bed,
3: a space for a second stage (lower stage) fluidized bed,
4: a perforated plate of the first stage fluidized bed,
5: a perforated plate of the second stage fluidized bed,
6: an inlet of infusibilized spherical pitch beads,
7: an outlet of activated carbon beads,
8: an inlet of an activating gas,
9: an outlet of an exhausted gas,
10: a bypass valve, and
11: a drainage.

DETAILED DESCRIPTION OF THE INVENTION

Figure 1:
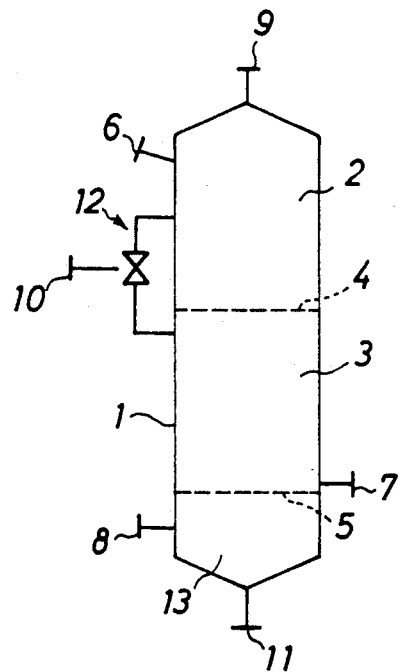
FIG. 1 of the attached drawing is a rough sketch of one of the ideas of the calcining and activating furnace of the present invention. However, the present invention is not necessarily restricted by the drawing.

The present invention relates to a method for activating infusibilized spherical pitch beads, which method uses a fluidized bed furnace provided with a first stage fluidized bed calcining, at 600° to 800° C., the infusibilized spherical pitch beads, obtained by molding a petroleum pitch, a coal pitch or a mixture thereof into spheres and infusibilizing the molded pitch, and a second stage fluidized bed activating, at 800° to 1,200° C., the calcined beads.

Further, the present invention relates to a method for activating infusibilized spherical pitch beads, which method uses the two stage fluidized bed furnace calcining and activating the infusibilized pitch beads obtained by mixing a viscosity-adjusting agent with a petroleum pitch, a coal pitch or a mixture thereof, molding the mixture into spheres, extracting and removing the agent from the molded beads with an organic solvent and then infusibilizing the beads with an air or other oxidant.

As a pitch used in the present invention, a petroleum pitch or a coal pitch is used. As the petroleum pitch, for instance, a pitch formed by thermal cracking of petroleum (crude oil, heavy oil, naphtha, asphalt, light oil, kerosene, etc.) or a thermally polymerized substance thereof is exemplified. As the coal pitch, a heavy substance such as high pitch, medium pitch, etc. is exemplified. The softening point of these pitches are preferably not lower than 140° C.

As the viscosity-adjusting agent, a bicyclic or tricyclic aromatic compound having a boiling point of not lower than 200° C. and a good compatibility with the pitch, for instance, one or more than one compounds selected from the group consisting of naphthalene, methylnaphthalene, phenylnaphthalene, benzylnaphthalene, methylanthracene, phenanthrene and biphenyl can be preferably used. Of these compounds, naphthalene is particularly preferable from the viewpoints of its remarkably large activity to adjust a viscosity and its ability to be easily extracted with a solvent. 5 to 50 parts by weight of the viscosity-adjusting agent to 100 parts by weight of pitch is generally preferable for the purpose. The amount of the viscosity-adjusting agent is properly controlled depending on properties of the pitch.

Melt-molding of the pitch is usually performed by publicly known, conventional method. For instance, to obtain spherical pitch beads, a method in which molten mixture of a viscosity-adjusting agent and a pitch is stirred in a water containing a surfactant under pressure and mold the mixture into spheres or a method disclosed in U.S. Pat. No. 4,420,443 wherein the molten mixture of the agent and pitch is extruded into a string and after cooled, crushed into pellets or rods, is used. The obtained pellets or the rods are heated to a temperature higher than its softening point and are thrown into water to mold the mixture into spheres.

From the obtained spherical pitch beads, the viscosity-adjusting agent is extracted and removed with an organic solvent according to the publicly known method disclosed in, for instance, G.B. Patent 1,383,085 A and U.S. Pat. No. 29,101. As the organic solvent, an aliphatic hydrocarbon, such as hexane or heptane, methanol, ethanol, etc. is used. The agent can be extracted and removed in one step or multiple steps.

By oxidizing the porous and spherical pitch beads by an oxidant at a temperature of not higher than 400° C., the porous and infusible spherical pitch beads, which are thermally infusible, are obtained. As the oxidant for the infusibilization, an oxidative gas such as $O_2$, $O_3$, $SO_3$, $NO_2$, an oxidative gas diluted with air or nitrogen, or air is used. Although the infusibilized spherical pitch beads obtained by this method still contain particles of not larger than 0.21 mm and larger than 0.78 mm in diameters, their particle size distribution is remarkably uniform and most part of them has diameters in the range of 0.40 to 0.78 mm.

The thus obtained infusibilized pitch beads are calcined and carbonized by using an apparatus of the present invention, for instance, as shown in FIG. 1. While using this FIG. 1, the method of the present invention will be explained as follows.

The infusibilized spherical pitch beads are thrown into an inlet 6 provided on the upper portion of a space 2 for a first stage (upper stage) fluidized bed of the two-stage fluidized bed furnace 1 and are heated from, usually, 300° C. to about 470° C. instantly while being fluidized by a gas from the lower stage fluidized bed (hereinafter referred to as the second stage or the lower stage), and thereafter, the heated pitch beads are further heated to a predetermined temperature between 600° and 800° C., preferably 600° and 750° C.

The temperature raising rate in this calcinating reaction is: 50° to 100° C./hr when the predetermined temperature is up to about 650° C. or 20° to 50° C./hr when the predetermined temperature is higher than about 650° C. After the predetermined temperature, which should not be higher than 800° C., has been reached, it is preferable to raise the temperature at a rate of 2° to 8° C./hr for a predetermined time period, more L preferably at a rate of 4° to 6° C./hr for 0.5 to 8.0 hours. The gas which has been already used in the calcination is discharged through an outlet 9.

At the time when the calcinating reaction in the first stage fluidized bed (hereinafter referred to as the first stage or the upper stage) is finished, the activating reaction in the second stage has already been over and thereafter the activated carbon beads are discharged through the outlet 7 placed at a side wall of the furnace while maintaining fluidization to thereby empty the space 3 for the second stage and the hot activated carbon discharged is cooled near to a room temperature passing through a cooler (not shown in FIG. 1) placed outside the furnace. After the discharge is over, the exhaust gas from the space 3 for the second stage is guided to the space 2 for the first stage through the bypass line 12, not through the perforated plate 4 of the first stage. As a result, fluidization of the carbon beads calcinated is stopped and the beads go down to the space 3 for the second stage through the holes of the perforated plate 4. Thereafter, in this method, after closing a valve 10 provided in the middle of the bypass line 12, the infusibilized pitch beads of next batch are thrown in through an inlet 6 located on the upper portion of the space 2 for the first stage, and thereby the calcination of next batch is started in the space 2. Simultaneously, in the space 3 for the second stage, the calcined pitch beads which have fallen down on the perforated plate 5 of the second stage by the above method are activated with a heated activating and fluidizing gas capable of activating the calcined pitch beads while forming the second stage fluidized bed in the space 3, the gas consisting mainly of, for example, nitrogen gas and steam and being heated to a temperature of from 800° to 1200° C. The heated activating and fluidizing gas is introduced to a bottom space 13 through an inlet 8.

The spherical carbon particles introduced into the space 3 for the second stage are heated from an initial temperature of usually 600° to 750° C. to a temperature of not lower than about 800° C. at a temperature raising rate of 10° to 100° C./hr, preferably 20° to 70° C./hr, and thereafter, are heated for the same time period as the heating period of the first stage at a temperature raising rate of 1° to 5° C./hr, preferably 2.5°–4.0° C./hr, thereby the activation of calcined carbon particles is accomplished.

In order to control the both temperatures of the upper and lower stages as above, the flow rate of activating gas, the amount of infusibilized pitch beads to be charged and the product of the height and diameter of fluidized bed should be considered. In these factors, it is necessary to maintain the rising gas velocity related to the gas flow rate in the range of not larger than the terminal fluidization gas velocity for the beads in the lower stage and of not smaller than the minimum fluidization gas velocity for the beads in the upper stage. Further, the amount of infusibilized beads to be charged is decided according to the treating time and the amount of activated carbon to be produced. Relating to the amount of infusibilized pitch beads to be charged, the inlet temperature of activating gas which is necessary for treating the molded particles, is decided according to the heat balance in the furnace. Practically, by controlling both of the temperature and flow rate of the activating gas introduced into the space 3 for the lower stage so that the temperature raising profile of the lower stage is satisfied, the temperature raising profile of the upper stage is automatically satisfied.

The inlet temperature of activating gas is increased, for example, at a raising rate of 50° to 300° C./hr, preferably 100° to 200° C./hr, from the initial temperature of 800° C. to a predetermined temperature between 1,000° to 1,400° C. and maintained at said predetermined temperature during the reaction. To adjust the inlet gas temperature, the gas is heated in a heater (not shown in FIG. 1) outside the furnace with a high temperature combustion gas as a heating medium or electric heater before entering into the furnace. As a gas used for calcining and activating the beads, steam, carbon dioxide or a gaseous mixture of either of these gases and nitrogen or oxygen gas is commonly used. Among these gases, a gaseous mixture containing nitrogen and not less than 50% volume of steam is preferably used.

During fluidization of the beads in the first stage, if the beads fall down through holes of the perforated plate 4 to the second stage, the beads having different reaction time are mixed and as a result an activated carbon having uniform quality can not be obtained. Accordingly, it is not preferable. Further, shorter transfer time of the beads from the space 2 for the first stage to the space 3 for the second stage, after the reactions are over, is preferable. That is, holes of the perforated plate 4 of the upper stage have calibers regulated so that the pitch beads do not fall down to the space 3 for the lower stage during the fluidization of the infusibilized pitch beads in the upper stage.

To achieve these points, it is preferable that calibers of holes of the perforated plate 4 of the upper stage are 2.0 to 6.0 mm, more preferable 3.0 to 5.0 mm and that an opening ratio of the holes is 1.0 to 3.0%, more preferable 1.5 to 2.0%. If the activated carbon remains somewhat on the perforate plate 5 when discharging the activated carbon from the furnace after the termination of activation, the activated carbon having nonuniform quality is produced and therefore, the such retention of activated carbon thereon is not preferred. Accordingly, in order to decrease the amount of remaining activated carbon and to improve the gas distribution, it is preferred that calibers of holes of the perforated plate 5 of the lower stage are 1.0 to 2.0 mm, more preferable 1.3 to 1.7 mm and that an opening ratio of the holes is 1.0 to 3.0%, more preferable 1.5 to 2.0%.

Further, since a part of the infusibilized pitch beads having nonuniform particle diameters probably falls down to the bottom space 13 passing through the perforated plate 5, the falling beads can be discharged from the furnace, for example, by providing a drainage 11 in the bottom space 13. On the other hand, when the infusibilized pitch beads are substantially uniform in particle diameter and hardly fall down to the bottom space 13, it is unnecessary to specifically provide the drainage 11 therein.

To have the spherical activated carbon beads of uniform in quality, it is necessary to make the gas distribution uniform and blending of the beads excellent.

Particularly, for a system with large capacity, as the height of fluidizing layer must be high from the viewpoint of productivity, determination of the adequate caliber size of holes of the perforated plate becomes important to secure good fluidization of the beads with good distribution of the gas. By applying the plates having the holes described above in the respective stage, each stage can have a good fluidization state up to 1,000 mm in height of stationary layer of the fluidizing bed. Further, to have a good distribution of the gas at each fluidizing layer, and to prevent the beads falling down through the holes of the each plate, it is reasonable that each plate must be even and flat. To maintain its evenness and flatness under a high temperature, it is preferable from the viewpoint of material strength that the furnace has a compact tower diameter. As the conventional one-stage fluidizing bed system has the temperature difference between the start of calcination and the end of activation as big as at least 500° to 600° C., a difficulty of selecting materials to resist such severe heat shock and its short life become problems and accordingly, long and stable operation and saving of the repairing cost too become difficult points to be solved.

To solve these points, although the expensive heat-resistant and anticorrosive materials have been used so far as they are the materials of the furnace, for the reduction of the repairing cost and the long term stabilized operation of the system to activate the infusibilized spherical pitch beads in the fluidized bed, it is desired to raise the temperature slowly from a temperature at the end of the infusibilization to a temperature of activation, for example, at a temperature raising rate of 50° C./hr and to further set the temperature of activation as low as possible, and accordingly the reaction time becomes inevitably longer. On the other hand, according to the method of the present invention, comparing with the conventional one-stage fluidized bed of 500 to 3,500 mm in diameter and of not more than 1,000 mm in height in the stationary state, the diameter of the furnace of the present invention is about 0.7 time that of the conventional system having the same capacity. Namely, size of the furnace and its area for installation is small. However, as the system of the present invention is operated batchwise, the height of the furnace is about two times of that of the conventional one having the same amount of beads in it. By making the diameter of the furnace small, its structural strength becomes larger than that of the conventional one-stage fluidized bed system. If the same material of the same thickness is used, the activation reaction at a higher temperature becomes possible and the reactions from carbonization to activation are completed within the time period of not more than $\frac{2}{3}$ of that of the conventional one. In other words, the amount of production per unit time, for instance, about 80 kg/hr in the conventional method, become possible to produce 120 to 150 kg/hr by the method of the present invention with the furnace of the same size.

In the activating system according to the present invention, by dividing the furnace into two stages, namely making the upper part of the furnace as a part calcining at 600° to 800° C. and making the lower part as a part activating at 800° to 1,200° C., it has become possible to keep the temperature difference between the upper part and the lower part at about 400° C. during the start to the end of the reaction and accordingly the heat shock against the wall of the furnace is remarkably reduced, namely, the temperature difference between the start and the end of the total reaction of the present invention is not more than about 400° C. It is at least about 100° to 200° C. less than that of the conventional one-stage fluidized bed system.

Additionally, by making the diameter of the furnace smaller, it has become possible to perform the activation at a higher temperature as has been described above, to reduce the thickness of material for construction, to select economical materials from the wide range and to have the material of long life. Moreover, since the calcination in the first stage fluidized bed is performed by the gas from the second stage, most part of the energy consumed for calcination in the conventional one-stage fluidized bed system to raise the temperature to 600° to 800° C. and also an amount of the gas can be reduced remarkably. Namely, the energy cost can largely be reduced. Further, even when the gas from the lower (second) stage contains steam, since the calcination temperature in the upper (first) stage is kept at not higher than 800° C. and at this temperature practically no activation reaction occurs, the activation reaction is seldom proceeded in the first stage but mostly in the second stage. Accordingly, as almost all the infusibilized pitch beads are only calcinated in the first stage, the activated carbon beads with uniform qualities can be obtained by the system of the present invention.

The qualities of the spherical activated carbon beads obtained by the two-stage fluidized bed activation method of the present invention are equivalent as those of the activated carbon beads obtained by the conventional rotary kiln system or the fluidize bed system. By the way, since the infusibilized pitch beads have been treated at the temperature of not higher than 400° C., when such beads are treated at a temperature between 400° and 600° C., a sticky tar-like substance is likely to be generated.

In the conventional multistage continuous fluidized bed system, since there is at least one region in which the infusibilized pitch beads are treated at the temperature up to 600° C., some of the holes of the perforated plate, which are provided to keep a good fluidization of the beads, are blocked by the tar-like substance generated and make the fluidization not uniform and finally lead to disturb a stable and long term operation of the system. Additionally, in the conventional multistage continuous fluidized bed system, since the residence time of each bead in each stage can not be uniform because of a continuous operation, results in large variation of the quality of the product. Accordingly, it is deemed that the conventional multistage continuous fluidized furnace is good as a regenerating furnace in which the calcination and activation are not so important, but not good as a furnace to activate the infusibilized spherical pitch beads.

In contrast to the conventional multistage continuous fluidized bed system which is likely to have a perforated plate with partially blocked holes by tar-like substance, in the two-stage fluidized bed system of the present invention, there is no perforated plate to be blocked by the tar-like substance, on the upper portion of the first stage since the temperature of the first stage is not lower than 600° C., and accordingly, it has no risk to have blocked holes of the plate and is capable of long and stable operation with a good and uniform fluidization.

The spherical activated carbon beads obtained by the two-stage fluidized bed batchwise activation method according to the present invention are effectively used in treatment of various gases, treatment of industrial waste water, purification of drinking water, desulfurization of exhaust gas and further purification of the blood in the artificial human organs.

The present invention will be explained more in detail while referring to Examples as follows. Further, these Examples are only exemplary, and the present invention is not to be limited to these Examples.

EXAMPLE 1

100 parts by weight of a pitch, which had been prepared by thermal cracking of naphtha, having a softening point of 182° C. and H/C (ratio in numbers of hydrogen atom to carbon atom) of 0.53 and containing 10% by weight of a quinoline-insoluble component, and 33 parts by weight of naphthalene were heated, melted and mixed, and the mixture was cooled to 80° to 90° C. and was extruded to a string-like pitch and thereafter, crushed into a rod-like pitch. The rod-like pitch was softened in an aqueous 0.5% solution of polyvinyl alcohol heated to 90° C., stirred and dispersed in the aqueous solution. The dispersion was cooled to form a slurry of the spherical pitch beads.

After screening the formed pitch beads into the range of particle diameter of 210 to 1,000 $\mu$m, naphthalene which had been used as a viscosity-adjusting agent was extracted by n-hexane.

Then, the pitch beads were infusibilized in the fluidized bed by being oxidized with air at 300° C. The obtained, infusibilized spherical pitch beads were introduced into the space for first-stage fluidized bed of the two-stage fluidized bed activating furnace of 2,200 mm in diameter and 7,500 mm in total height (the height of each stationary layer of the first and second stages are about 900 mm, respectively), heated from 300° C. to about 470° C. instantly, further heated to 600° C. at a temperature raising rate of 50° C./hr and then calcinated for about 6.5 hours at a temperature raising rate of 5° C./hr, by a gaseous mixture of steam and nitrogen (1:1 by volume).

Thereafter, the most part of the gas coming from the second stage was guided to the first stage through by-pass line 12 and the spherical carbon beads (the calcined beads) fall down to the space 3 for second-stage fluidized bed. The average particle diameter of the carbon beads was 600 $\mu$m and the particles were spherical in their shape.

EXAMPLE 2

The spherical carbon beads obtained in Example 1 were heated in the second-stage fluidized bed of the furnace of Example 1 by an activating gas (consisting of steam and nitrogen of the volume ratio of 1:1) from the initial temperature of 600° C. to 870° C. at a temperature raising rate of 50° C./hr, and were activated for 4 hours at a temperature raising rate of 3.0° C./hr. After the activation, the spherical activated carbon beads were discharged through the outlet 7.

The output of the activated carbon beads per unit time was 140 kg/hr.

During the activation, any blocking of the perforated plate of the first-stage fluidized bed was not observed.

Further, the properties of the obtained spherical activated carbon beads were as follows:

The yield of activation was 40%, the apparent density was 0.58 g/ml, the iodine-adsorbing amount was 1,200 mg/g and the caramel decolorization ratio was 88%.

COMPARATIVE EXAMPLE 1

The infusibilized spherical pitch beads obtained in Example 1 were heated from 300° C. to 810° C. in the one-stage batchwise fluidized bed of 3,450 mm in diameter and 5,000 mm in total height (the height of the stationary layer is 900 mm) by using an activating gas consisting of steam and nitrogen (volume ratio of 1:1)

and were kept at that temperature for 14 hours to be activated and the spherical activated carbon beads were obtained.

The amount of production of the product per unit time was 83 kg/hr. The properties of the spherical activated carbon beads were as follow:

Shape of the beads was spherical with an average particle diameter of 600 μm, the apparent density was 0.60 g/ml, the iodine-adsorbing amount was 1,100 mg/g and the caramel decolorization ratio was 85%.

EXAMPLE 3

The infusibilized spherical pitch beads obtained in Example 1 were calcined and activated in the two-stage fluidized bed activating furnace of Example 1 while using a gaseous mixture consisting of steam and nitrogen in the volume ratio of 7:3 as the activating gas to obtain the spherical activated carbon beads.

The temperature of the activating gas, at the entrance, was 800° C. at the start and was raised to 1,100° C. The temperature within the second stage fluidized bed was 720° C. at the beginning and was raised to 820° C. at the rate of 50° C./hr and then the beads were treated for 6 hours at the temperature raising rate of 3.0° C./hr.

The temperature of the first-stage fluidized bed was started from 300° C. and was raised to 480° C. instantly, and after that, the temperature was slowly raised and the final temperature was 720° C. The reaction time in each stage was 8 hours, and it means that the beads were treated for 16 hours as the total reaction time. The amount of production of the beads per unit time was 125 kg/hr. The properties of the obtained spherical activated carbon beads were as follows:

The average particle diameter was 600 μm, the yield of activation was 40%, the apparent density was 0.58 g/ml, the iodine adsorbing amount was 1,200 mg/g and the caramel decolorization ratio was 86%.

COMPARATIVE EXAMPLE 2

The infusibilized spherical pitch beads obtained in Example 1 were heated from 300° C. to 810° C. in the one-stage batchwise fluidized bed of Comparative Example 1 while using an activating gas consisting of steam and nitrogen in a volume ratio of 7:3 and were kept for 15 hours at 810° C. to be activated and obtain the spherical activated carbon beads. The output of the beads per unit time was 80 kg/hr. The properties of the spherical activated carbon beads were as follows:

The average particle diameter was 600 μm, the apparent density was 0.58 g/ml, the iodine-adsorbing amount was 1,200 mg/g and the caramel decolorization ratio was 87%.

DETAILED DESCRIPTION OF THE DRAWING

FIG. 1 of the attached drawing is a rough sketch which gives one example of the activating furnace used in the present invention conceptionally.

The outline of the activating furnace is explained as follows:

The preliminarily heated activating gas is introduced into the furnace usually through an inlet 8 of the activating gas and is discharged through an outlet 9 while passing through the space 3 for second stage fluidized bed and the space 2 for first stage fluidized bed.

A predetermined amount of the infusibilized spherical pitch beads is introduced into the furnace from an inlet 6 of the beads, and the beads form the fluidized bed in 2 and are calcined. After discharging all the spherical activated carbon beads in the second stage fluidized bed in 3 out of the furnace through an outlet 7, the bypass valve 10 is opened so that the gas goes into 2 through the bypass line and the fluidization in 2 is stopped and the carbonized beads flow down through the holes of the perforated plate 4 to 3. The beads form a fluidized bed in 3 and the activation reaction starts.

At the time when the transfer of the carbonized beads from 2 to 3 is finished, the infusibilized spherical pitch beads are introduced into 2 again after closing 10.

By repeating the batchwise operation as has been described above, the infusibilized spherical pitch beads are uniformly activated.

Further, 4 and 5 respectively show the perforated plates of the first- and the second-stage fluidized beds, 1 shows the main body of the two-stage fluidized activating furnace, 11 shows the scupper of the drain and the spherical beads which come through the perforated plate 5 of the second-stage fluidized bed by chance and 13 shows the bottom space.

What is claimed is:

1. A method of calcining and activating infusiblized spherical pitch beads in a batchwise manner in a multi-compartment fluidized bed apparatus having an upper stage fluidized bed for calcining the pitch beads, a lower stage fluidized bed for activating calcined pitch beads, the lower stage fluidized bed positioned below the upper stage fluidized bed, and a bottom space with a first perforated plate separating the upper stage from the lower stage, a second perforated plate separating the lower stage from the bottom space and a bypass line having a bypass valve in it connecting the upper and lower stages and bypassing the first perforated plate, said method comprising the steps of:
    (1) introducing a batch of infusibilized spherical pitch beads into and calcining the spherical beads in the supper stage fluidized bed at a temperature of 600° to 800° C. with a hot gas, which is the exhaust gas from the lower stage fluidized bed, introduced into the upper stage through holes of the first perforated plate from the lower stage, wherein the holes of the first perforated plate are sized so that the spherical beads do not fall down through the holes when fluidized but are large enough to permit the spherical beads to fall through them when not fluidized;
    (2) discharging a batch of activated carbon spherical beads, activated immediately before, from the lower stage fluidized bed;
    (3) stopping the fluidization in the upper stage fluidized bed above the first perforated plate by passing the fluidizing gas through a bypass line upwardly bypassing the first perforated plate and forcing the spherical calcined pitch beads to fall downwardly through the holes of the first perforated plate to the lower stage; and
    (4) activating the thus calcined spherical pitch beads at a temperature of 800° to 1,200° C. by fluidizing them in the lower stage fluidized bed on the second perforated plate with a heated activating gas of which the rising velocity through the holes is maintained not greater than the terminal fluidization gas velocity for the spherical beads on the second perforated plate which plate has calibers of holes of 1.0 to 2.0 mm and an opening ratio of 1.0 to 3.0% and not less than the minimum fluidization gas velocity for the spherical beads on the first perforated plate having the calibers of holes of 2.0 to 6.0 mm and an opening ratio of 1.0 to 3.0%.

2. The method according to claim 1, wherein said infusibilized spherical pitch beads are produced by a process comprising the steps of:

(a) preparing pitch beads from a mixture comprising 100 parts by weight of a petroleum pitch, a coal pitch or a mixture of the two and 5 to 50 parts by weight of a viscosity adjusting agent selected from the group consisting of bicyclic and tricyclic aromatic compounds having a boiling point of not less than 200° C., and mixtures thereof;

(b) extracting and removing the viscosity adjusting agent from the spherical pitch beads with a solvent to form porous spherical pitch beads;

(c) infusibilizing the porous spherical pitch beads; and thereafter (d) introducing the thus prepared porous spherical pitch beads into step (1) of claim 1.

* * * * *